United States Patent Office 3,523,753
Patented Aug. 11, 1970

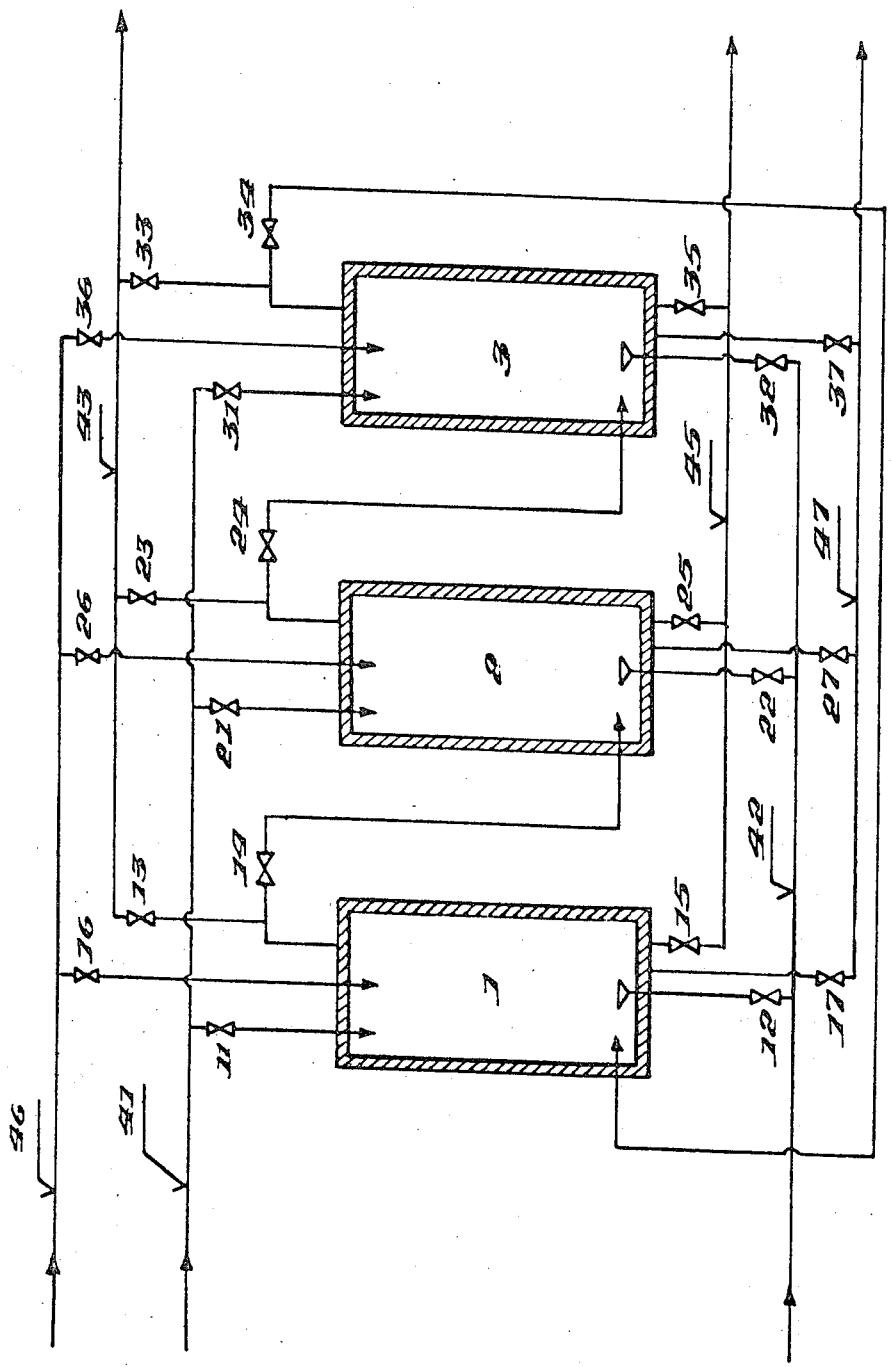

3,523,753
METHOD OF OBTAINING HYDROGEN CHLORIDE GAS, AQUEOUS HYDROGEN BROMIDE SOLUTIONS AND POSSIBLY BROMINE
Herbert Jenkner, Cologne-Deutz, Germany, assignor to Chemische Fabrik Kalk G.m.b.H., Cologne-Kalk, Germany
Filed Oct. 6, 1967, Ser. No. 673,348
Claims priority, application Germany, Oct. 12, 1966, C 40,366, C 40,367
Int. Cl. C01b 7/08, 7/10, 7/12
U.S. Cl. 23—154                                7 Claims

ABSTRACT OF THE DISCLOSURE

Method for the production of HCl gas from aqueous HCl solutions and for the production of aqueous HBr solutions comprising introducing a quantity of HBr gas into the aqueous HCl solution which is at least equimolar with respect to the HCl and collecting the HCl gas which is driven out from the resulting aqueous HBr solution. If desired, bromide is obtained from the latter by reaction with chlorine.

---

It is known to obtain hydrogen chloride gas from aqueous hydrogen chloride solutions by adding concentrated sulphuric acid. To make the reaction rapid and complete, it has been found helpful to add a layer of liquid paraffin to the aqueous solution. Although this method is technically very practicable it has the disadvantage of consuming a fairly large quantity of sulphuric acid. The concentrated sulphuric acid is converted into a dilute acid which is adulterated with hydrogen chloride and for which there are virtually no industrial applications unless the expensive step of purifying and concentrating it is undertaken. Hydrogen chloride gas can further be obtained by evaporating concentrated aqueous hydrogen chloride solution at boiling temperature. However, this method is technically unfavourable since an azeotropically boiling mixture forms in the solution where the latter contains about 20% by weight HCl. It also involves consuming a large amount of energy. It would therefore be advantageous to discover other ways of obtaining hydrogen chloride gas from its aqueous solution without encountering these disadvantages.

On the other hand hydrogen bromide gas is formed as a by-product of bromine substitution in organic compounds. This is frequently passed into water to form aqueous hydrobromic acid which can be used in the preparation of inorganic bromides.

It has now been found possible to combine these two methods in a way which can easily be carried out in industry.

A method has been discovered for obtaining hydrogen chloride gas, by adding an acid to an aqueous hydrogen chloride solution, for obtaining hydrogen bromide solution and possibly for obtaining bromine from the latter by reaction with chlorine. By this method hydrogen bromide gas is passed into the aqueous hydrogen chloride solution in a quantity at least equimolar with the HCl content of the solution, and the hydrogen chloride gas which is driven out is collected in known manner.

It has been found that if hydrogen bromide gas is passed into aqueous hydrochloric acid, pure hydrogen chloride gas will escape from the resultant mixture, leaving behind an aqueous hydrogen bromide solution. In the aqueous hydrogen chloride solutions used for the method of the invention, the concentration of hydrogen chloride measured at room temperature will be about 2 to 40% by weight. A solution containing both hydrogen chloride and hydrogen bromide may also be employed; such mixtures are obtained, for example, when brominating organic compounds together with chlorine and bromine. The process can be carried out without difficulty at temperatures ranging from −30 to +100° C., although from the point of view of technique and energy it is advantageous to operate at the easily maintained temperatures of from +10 to +35° C.

The technical execution of the method is very simple. Aqueous hydrogen chloride solution is charged to a reaction zone, and hydrogen bromide gas passed into it until all the hydrogen chloride has escaped. For this purpose quantities of hydrogen bromide gas at least equimolar with the hydrogen chloride content are required. The hydrogen chloride gas obtained is very pure and may be used immediately for most industrial processes, possibly after drying. The hydrogen bromide solution also obtained will usually still contain small quantities of hydrogen chloride. It can nevertheless also be used for many technical applications. If the residual hydrogen bromide solution is required to be very pure, then the quantity of hydrogen bromide gas to be passed into the aqueous hydrogen chloride solution must be 5 to 100% greater than the quantity of hydrogen bromide equimolar with the hydrogen chloride content of the solution.

The aqueous hydrogen bromide solution obtained in this manner may be used to prepare inorganic bromides, although it is also possible to obtain bromine therefrom by introducing chlorine. It has been found advantageous to pass a maximum of 0.48 mol of chlorine gas into the aqueous hydrogen bromide solution per mol of the HBr content. An aqueous hydrogen chloride solution is then left behind.

As a result of the introduction of chloride the hydrogen bromide is oxidised to free bromine. According to the invention the amount of chlorine used for this purpose must be less than the amount required to oxidise the hydrogen bromide contained in the solution. For the method of the invention about 99% of the amount of chlorine necessary for such oxidation may be used. The method can also quite readily be carried out with less than 10% of the amount required for oxidation. For large scale industrial applications of the method it is advisable, owing to the inaccuracy of volume control means, for a maximum of 0.48 mol of chlorine to be used per mol of hydrogen bromide contained in the aqueous solution. For the process to be carried out rationally on an industrial scale, the amount of chlorine added should be from 0.4 to 0.48 mol per mol of hydrogen bromide in the solution. It is advantageous to keep the reaction mixture at room temperature during the introduction of the chlorine. The chlorine should be introduced at a speed such that it is completely absorbed by the solution. The bromine which is thereby formed collects at the bottom of the reaction vessel, from where it is withdrawn from the mixture. This bromine contains no chlorine and is pure enough for most technical purposes, particularly for brominating organic compounds. If purer bromine is required, it can be further purified by a single distillation and will not need to be heated for a long period with reflux cooling.

Before or after the separation of the bromine, hydrogen bromide gas may be passed by the above method into the reaction solution, which now contains hydrogen chloride, so that the latter can be obtained as a gas. In order that the hydrogen chloride can be driven out in the form of a gas, bromine is put into the reaction solution in a quantity at least equimolar with the quantity of dissolved hydrogen chloride; a 5 to 100% bromine surplus may be applied.

The method of the invention for expelling hydrogen chloride gas from its aqueous solutions by passing hydrogen bromide gas into the latter may be carried out in one reaction vessel or in several arranged one behind the other. The use of a plurality of vessels arranged in series is particularly indicated, according to the invention, where extremely pure hydrogen bromide solutions have to be prepared. Vessels most suitable for the reaction are washing towers, cooling columns or similar reactors made of glass, acid-proof plastics or enamelled iron.

The process of the invention may, for example, be carried out in the installation shown diagrammatically in the figure. This comprises vessels 1, 2 and 3. By opening the valves 11, 21 and 31 aqueuos hydrogen chloride solution is introduced into the vessels 1, 2 and 3 through the collecting tube 41. When the valves 11, 21 and 31 have been closed hydrogen bromide gas, possibly in excess, is passed through the collecting tube 42 with the valves 22 and 32 closed, through the opened valve 12 and into the vessel 1. It will be dissolved to saturation point in the solution contained in the vessel 1 and will expel the hydrogen chloride therefrom. When the valve 13 is closed the hydrogen chloride, possibly together with surplus hydrogen bromide, is passed through the open valve 14 into the vessel 2. The hydrogen chloride escaping therefrom, which may still contain traces of hydrogen bromide, is brought through the valve 24 into the vessel 3, the valve 23 being closed. The stream of gas which escapes from the vessel through the open valve 33 into the collecting tube 43 while the valve 34 is closed is pure hydrogen chloride. When the solution in the vessel 1 has been freed from hydrogen chloride with hydrogen bromide, the valves 12 and 14 are closed. The vessel 1 is then emptied into the collecting tube 45 through the valve 15. It is then recharged with aqueous hydrogen chloride solution from the tube 41 through the valve 11. When the valve 11 has been closed, the vessel 1 takes over the function of the vessel 3, while the vessel 2 takes the place of vessel 1.

If the vessels 1, 2 and 3 are charged with dilute hydrogen chloride solution and hydrogen bromide gas is passed into vessel 1 from the collecting tube 42 by way of the valve 12, the valves 14 and 24 being open, the hydrogen chloride solution first in vessel 2 and then in vessel 3 will show a higher concentration than its initial one, and a hydrogen bromide solution will form in vessel 1. A concentrated hydrogen chloride solution can be withdrawn from the tube 47 through valves 27 and 37.

In another form of the method according to the invention only one or two of the vessels 1, 2 and 3 are charged with aqueous hydrogen chloride solution, while the other vessels are filled with water from the collecting tube 46 through the open valves 16, 26 and/or 36. In a vessel which at the beginning of the process contains only water, there is formed in the course of the process a solution containing hydrogen chloride and possibly hydrogen bromide. The hydrogen chloride can be expelled from this solution with hydrogen bromide gas by changing over the vessels as described above, and possibly cutting out one or two vessels completely. This procedure is advisable whenever the quantities of hydrogen chloride gas required are relatively small and the hydrogen bromide solution has to be very pure.

The installation shown diagrammatically in the figure for carrying out the method of the invention may of course consist of two vessels only or of more than three.

By the method of the invention it is now possible for the hydrogen bromide gas obtained from bromine substitution in organic compounds to be used to prepare hydrogen chloride gas from an aqueous solution. It is also posible to convert a dilute aqueous hydrogen chloride solution into a concentrated solution by a technically simple method. It is well known that such concentration of aqueous hydrogen chloride solutions simply by evaporating the water is impossible since an azeotropic mixture is formed. In addition a concentrated aqueous hydrogen bromide solution is obtained. It is surprising that the method of the invention can be carried out. One would have expected the introduction of hydrogen bromide into aqueous hydrogen chloride solutions to produce mixtures of solution and gas which could only be separated with a considerable technical effort.

The invention not only makes additional use of the hydrogen bromide gas but also dispenses with the sulphuric acid which is otherwise required to obtain hydrogen chloride gas from its aqueous solution. The invention thus provides a technically simple method of recovering the bromine from hydrogen bromide, particularly as obtained from bromine substitution in organic compounds, without using excess chlorine for the purpose. Pure hydrogen chloride gas is additionally obtained. As a further by-product, saturated hydrogen bromide solution free from hydrogen chloride can be withdrawn at the end of the process.

Examples of the method of the invention are given below.

EXAMPLE 1

In a plant constructed as shown diagrammatically in the figure and comprising two vessels 1 and 2, an aqueous hydrogen chloride solution containing 38.4% by weight HCl is passed along the tube 41 and through valves 11 and 21 into the vessels 1 and 2. When the valves 11 and 21 have been closed, hydrogen bromide gas is passed from the tube 42 through the valve 12 into the vessel 1, with the valve 22 closed. The valves 14 and 23 are open and the valves 13 and 24 closed. In the course of three hours 77.4 parts by weight of hydrogen bromide gas are passed into the vessel 1, the temperature in the reaction vessels being about 20° C. When all the gas has been passed in, the solution in vessel 1 has a bromide concentration of 59.5% by weight and a residual chloride content of 1.5%, while vessel 2 contains a hydrogen chloride solution which is free from hydrogen bromide and contains 38.9% by weight HCl. The solution from vessel 1 is withdrawn by way of valve 15 and tube 45, and the solution from vessel 2 through valve 27 and tube 47. 20.4 litres of pure hydrogen chloride gas are taken from tube 43.

EXAMPLE 2

In a plant constructed as shown diagrammatically in the figure and comprising three vessels 1, 2 and 3, an aqueous hydrogen chloride solution with 38.4 HCl is introduced along tube 41 and through valve 11 into vessel 1, with valves 21 and 31 closed. Vessels 2 and 3 are charged with water from tube 46 by way of valves 26 and 36, the valve 16 being closed. When valves 11, 26 and 36 have been closed, hydrogen bromide gas is passed out of tube 42, through valve 12 into vessel 1, with valves 22 and 32 closed. Valves 13, 23 and 34 are closed and valves 14, 24 and 33 open. In the course of three hours 182 parts by weight of hydrogen bromide gas are passed into vessel 1, the temperatures in the reaction vessels being about 20° C. When all the gas has been introduced the valves 12 and 14 are closed. The solution in vessel 1 has a hydrogen bromide concentration of 63.45% by weight and no longer contains any hydrogen chloride. The solution in vessel 2 has a hydrogen bromide concentration of 22.4% by weight and a hydrogen chloride concentration of 21.6%, while the solution in vessel 3 has a hydrogen chloride concentration of 0.26%. The pure aqueous hydrogen bromide solution is removed from vessel 1 through valve 15 and tube 45. In the course of two hours 40 parts by weight of hydrogen bromide are then passed into vessel 2 through tube 42 and valve 22 with valves 12 and 32 closed. When this step is over valves 22 and 24 are closed. The solution in vessel 2 now has a bromide concentration of 62.4% by weight and no longer contains any chloride. The solution in vessel 3 has a bromide concentration of 22.4 and a chloride concentration of 21.6% by weight and can be used for a further cycle. 15 litres of pure hydrogen chloride gas are removed from tube 43.

EXAMPLE 3

In an enameled reaction vessel provided with an apparatus for blowing in and collecting gases and an apparatus for removing liquids, 67.5 parts by weight of chlorine are introduced for every 362 parts of a hydrobromic acid containing 162 parts by weight of hydrogen bromide in solution. Thus 0.475 mol of chloride in introduced per mol of HBr. During the introduction of the chlorine a temperature of 20 to 40° C. is maintained in the reaction mixture by cooling. When all the chlorine has been added 149 parts by weight of chlorine-free bromine are removed from the bottom of the vessel. This leaves an aqueous solution containing 69.4 parts by weight of hydrogen chloride and 8 parts of hydrogen bromide. 178 parts of hydrogen bromide gas are passed into this solution; all the hydrogen chloride present in the solution escapes as a gas and is collected. An aqueous hydrogen bromide solution is left behind, which can be recycled to produce bromine by the same method.

I claim:
1. A method of obtaining hydrogen chloride gas and bromine gas which comprises:
   (a) passing hydrogen bromide into an aqueous solution of hydrochloric acid to produce an aqueous solution of hydrogen bromide and hydrogen chloride gas the hydrogen bromide gas being supplied in an amount which is at least equimolar with the hydrogen chloride present in the aqueous solution of hydrochloric acid;
   (b) recovering the hydrogen chloride gas which is liberated from the aqueous solution of hydrochloric acid; and
   (c) passing chlorine gas into the aqueous solution of hydrogen bromide so as to produce and liberate bromine gas.
2. A method according to claim 1, characterised in that chlorine gas is passed into the resultant aqueous solution of hydrogen bromide at a maximum rate of 0.48 mol per mol of HBr in the solution.
3. A method of obtaining hydrogen chloride gas and bromine gas which comprises:
   (a) passing hydrogen bromide into an aqueous solution of hydrochloric acid to produce an aqueous solution of hydrogen bromide and hydrogen chloride gas the hydrogen bromide gas being supplied in an amount which is at least equimolar with the hydrogen chloride present in the aqueous solution of hydrochloric acid;
   (b) recovering the hydrogen chloride gas which is liberated from the aqueous solution of hydrochloric acid; and
   (c) passing chlorine gas into the aqueous solution of hydrogen bromide so as to produce and liberate bromine gas and convert the aqueous solution of hydrogen bromide to an aqueous solution of hydrogen chloride;
   (d) repeating steps (a), (b) and (c).
4. A method according to claim 3, characterised in that hydrogen bromide is passed into the aqueous hydrogen chloride solution in a quantity 5 to 100% greater than the quantity of hydrogen bromide equimolar with the hydrogen chloride content of the solution.
5. A method of obtaining hydrogen chloride gas which comprises:
   (a) passing hydrogen bromide into an aqueous solution of hydrochloric acid to produce an aqueous solution of hydrogen bromide and hydrogen chloride gas, the hydrogen bromide gas being supplied in an amount which is at least equimolar with the hydrogen chloride present in the aqueous solution of hydrochloric acid; and
   (b) recovering the hydrogen chloride gas which is liberated from the aqueous solution of hydrochloric acid.
6. A method of claim 5 for producing hydrogen chloride gas from an aqueous solution of hydrogen chloride comprising passing at −30 to 100° C. hydrogen bromide gas into the aqueous solution in a quantity at least equimolar with the hydrogen chloride content of the aqueous solution.
7. The method of claim 5 wherein the hydrogen bromide gas is passed into the aqueous solution of hydrogen chloride at 10 to 35° C.

References Cited

FOREIGN PATENTS

| | | |
|---|---|---|
| 820,093 | 9/1959 | Great Britain. |
| 998,681 | 7/1965 | Great Britain. |

OTHER REFERENCES

McPherson & Henderson book, "A Course in General Chemistry," Third Edition (1927), p. 370, Ginn & Co., New York.

EDWARD STERN, Primary Examiner

U.S. Cl. X.R.

23—216; 55—71